United States Patent
Roy et al.

(10) Patent No.: US 9,411,657 B2
(45) Date of Patent: Aug. 9, 2016

(54) LOAD-BALANCED SPARSE ARRAY PROCESSING

(71) Applicant: Hewlett-Packard Development Company, L.P., Houston, TX (US)

(72) Inventors: Indrajit Roy, Mountain View, CA (US); Shivaram Venkataraman, Berkeley, CA (US); Alvin Auyoung, San Jose, CA (US); Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 463 days.

(21) Appl. No.: 13/673,702

(22) Filed: Nov. 9, 2012

(65) Prior Publication Data

US 2014/0137134 A1  May 15, 2014

(51) Int. Cl.
*G06F 9/46* (2006.01)
*G06F 9/50* (2006.01)

(52) U.S. Cl.
CPC ............ *G06F 9/5083* (2013.01); *G06F 9/5061* (2013.01)

(58) Field of Classification Search
None
See application file for complete search history.

(56) References Cited

U.S. PATENT DOCUMENTS

| 4,920,487 | A  | * | 4/1990 | Baffes | ............................ | 718/105 |
| 6,003,036 | A  |   | 12/1999 | Martin |  |  |
| 6,182,085 | B1 | * | 1/2001 | Eichstaedt et al. |  |  |
| 8,447,757 | B1 | * | 5/2013 | Cox | .............................. | 707/720 |
| 8,904,398 | B2 | * | 12/2014 | Chung et al. | ................... | 718/102 |
| 2005/0246711 | A1 | * | 11/2005 | Berstis et al. | ................. | 718/105 |
| 2007/0198986 | A1 | * | 8/2007 | Panziera | ........................ | 718/105 |
| 2009/0077398 | A1 | * | 3/2009 | Bland et al. | .................... | 713/320 |
| 2011/0047555 | A1 | * | 2/2011 | Lakshmanan et al. | ......... | 718/105 |
| 2011/0307685 | A1 | * | 12/2011 | Song | ....................... | G06F 17/10 712/16 |
| 2012/0089382 | A1 |   | 4/2012 | Fisher et al. |  |  |

OTHER PUBLICATIONS

Boman, E G et al~"The Zoltan and Isorropia Parallel Toolkits for Combinatorial Scientific Computing: Partitioning, Ordering and Coloring"~Sandia V20 # 2~Mar. 2, 2012~129-150.

Das, S.,et al., "Ricardo: Integrating R and Hadoop", SIGMOD '10, Jun. 6-11, 2010, Indianapolis, Indiana, USA., pp. 987-998.

Dean, J., et al., "MapReduce: Simplified Data Processing on Large Clusters", USENIX Association OSDI 2004: 6th Symposium on Operating Systems Design and Implementation, pp. 137-149.

(Continued)

*Primary Examiner* — Kenneth Tang
(74) *Attorney, Agent, or Firm* — Wagner Blecher, LLP (57) ABSTRACT

A sparse array is partitioned into first partitions and a second array is partitioned into second partitions based on an invariant relationship between the sparse array and the second array. The sparse array and the second array are associated with a computation involving the sparse array and the second array. The first partitions and the corresponding second partitions are distributed to workers. A different first partition and corresponding second partition is distributed to each of the workers. Third partitions of the sparse array and corresponding fourth partitions of the second array are determined based on the invariant relationship and measurements of load are received from each of the workers. At least one of the first partitions and the corresponding second partition is different from one of the third partitions and the corresponding fourth partition. The at least one of the first partitions and the corresponding second partition that is different is redistributed among the workers. A different third partition and corresponding fourth partition is executed by each of the workers.

15 Claims, 6 Drawing Sheets

(56) References Cited

OTHER PUBLICATIONS

Gonzalez, J., et al., "PowerGraph: Distributed Graph-Parallel Computation on Natural Graphs", USENIX Association, 10th USENIX Symposium on Operating Systems Design and Implementation (OSDI 2012), pp. 17-30.

Kyrola, A., et al., "GraphChi: Large-Scale Graph Computation on Just a PC", USENIX Association, 10th USENIX Symposium on Operating Systems Design and Implementation (OSDI 2012), pp. 31-46.

Lehoucq, R.B., et al., ARPACK Users' Guide: Solution of Large Scale Eigenvalue Problems with Implicitly Restarted Arnoldi Methods, (www.caam.rice.edu/software/ARPACK/UG/ug.html), Oct. 8, 1997, 152 pgs.

Malewicz, G., et al., "Pregel: A System for Large-Scale Graph Processing", SIGMOD '10, Jun. 6-11, 2010, Indianapolis, Indiana, USA, pp. 135-145.

Murray, D., et al.. "CIEL: A Universal Execution Engine for Distributed Data-Flow Computing", 2011, 14 pgs.

Power, R., et al., "Piccolo: Building Fast, Distributed Programs with Partitioned Tables", 2010, http://news.cs.nyu.edu/piccolo, 14 pgs.

Qian, Z., et al:, "MadLINQ: Large-Scale Distributed Matrix Computation for the Cloud", EuroSys '12, Apr. 10-13, 2012, Bern, Switzerland, 14 pgs.

Yu, Y., et al., "DryadLINQ: A System for General-Purpose Distributed Data-Parallel Computing Using a High-Level Language", 2008, 14 pgs.

Zaharia, M., et al., "Resilient Distributed Datasets: A Fault-Tolerant Abstraction for In-Memory Cluster Computing", 2012, 14 pgs.

Chen; Y et al., "CgmOLAP: Efficient Parallel Generation And Querying Of Terrabyte Size ROLAP Data Cubes", 2006, 2 pages.

Venugopal, S. et al., "Effects Of Partitioning And Scheduling Sparse Matrix Factorization On Communication And Load Balance", Oct. 1991, 10 pages.

\* cited by examiner

LOAD-BALANCED SPARSE ARRAY PROCESSING

RELATED APPLICATION SECTION

This application is related to the copending U.S. patent application Ser. No. 13/554,891, entitled "Distributed Continuous Analytics" with the filing date of Jul. 20, 2012, by Venktaraman, et al., and assigned to the assignee of the present application.

BACKGROUND

Many businesses obtain insights from data by performing large scale machine learning and analyses based on mathematical graphs. Many of these algorithms can be easily and efficiently expressed using matrix operations. Matrix based algorithms involve structured processing: Matrices can be used to define the structure of the data. For example, a social media web site may use one or more matrices to represent the graph—consisting of friendship relationships between people—to determine, for example, whether one person will influence another person. This is just one example of how matrices can be used to perform learning and graph analysis on large scale data.

BRIEF DESCRIPTION OF THE DRAWINGS

The accompanying drawings, which are incorporated in and form a part of this Description of Examples, illustrate various examples of the present invention and, together with the description, serve to explain principles discussed below: The Figures are not drawn to scale unless specified.

DETAILED DESCRIPTION EXAMPLE

Reference will now be made in detail to various examples of the subject matter, which are illustrated in the accompanying drawings. While various example details are discussed herein to provide a thorough understanding of the examples, it will be understood that example the examples may be practiced without limitation to these specific details. On the contrary, the presented examples are intended to cover alternatives, modifications and equivalents, which may be included within the spirit and scope of the various examples as defined by the appended claims. In other instances, well known methods, procedures, components, and circuits have not been described in detail as not to unnecessarily obscure aspects of the described examples.

Unless specifically stated otherwise as apparent from the following discussions, it is appreciated that throughout the description of various examples, discussions utilizing terms such as "partitioning," "distributing," "determining," "redistributing," "determining," "sorting," "splitting," "merging," "using," "controlling," "calculating," "comparing," "prioritizing," "associating," "monitoring," "receiving," "computing," "repartitioning," "obtaining," "executing," "storing," "detecting," "causing," "transforming data," "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Almost all of the elements of a dense array include an explicitly stored value. Dense arrays can be divided into equal partitions and each partition can be distributed to a different worker. For example, if a dense array includes 100,000 rows and there are 100 workers, the dense array can be divided into 100 partitions that each includes 1,000 rows (100,000 rows divided by 100 workers). Each of the workers can perform approximately the same amount of work because each of the dense partitions includes approximately the same number of values.

In contrast, most of the elements of a sparse array have a default value (usually zero) and so the value is not explicitly stored, and for most array operations, no work is associated with these default values. In the remainder of this disclosure, the term "nonzero value" means any explicitly stored, non-default value in a sparse array. So if a sparse array is partitioned into partitions having equal numbers of rows or columns, then there may be an unequal number of stored nonzero values in each partition. For example, assume that the sparse array includes 100,000 rows and there are 100 workers resulting in each of the 100 sparse partition including 1,000 rows. A first sparse partition may include 2 nonzero values while a second sparse partition may include 300 nonzero values. Therefore, the execution time of a first worker that processes the first partition may be significantly less than the execution time of a second worker that processes the second partition.

According to one example, it is inefficient to load balance the workers by merely counting the number of nonzero values and ensuring that each partition has the same or approximately the same number of nonzero values because the number of elements associated with the one or more arrays is too vast to partition efficiently. Therefore, according to one example, the workers that execute partitions of a sparse array are load balanced by repartitioning the sparse array. According to one example, a master controls partitioning and repartitioning of the sparse array among the workers.

The workers and the master may be threads that execute on a single physical machine or one or more workers may execute on two or more physical machines. According to one example, each of the master and the workers execute on separate physical machines. The sparse array and the second array are referred to as "distributed arrays" because their partitions can be processed by separate workers as discussed herein.

Figure 1:
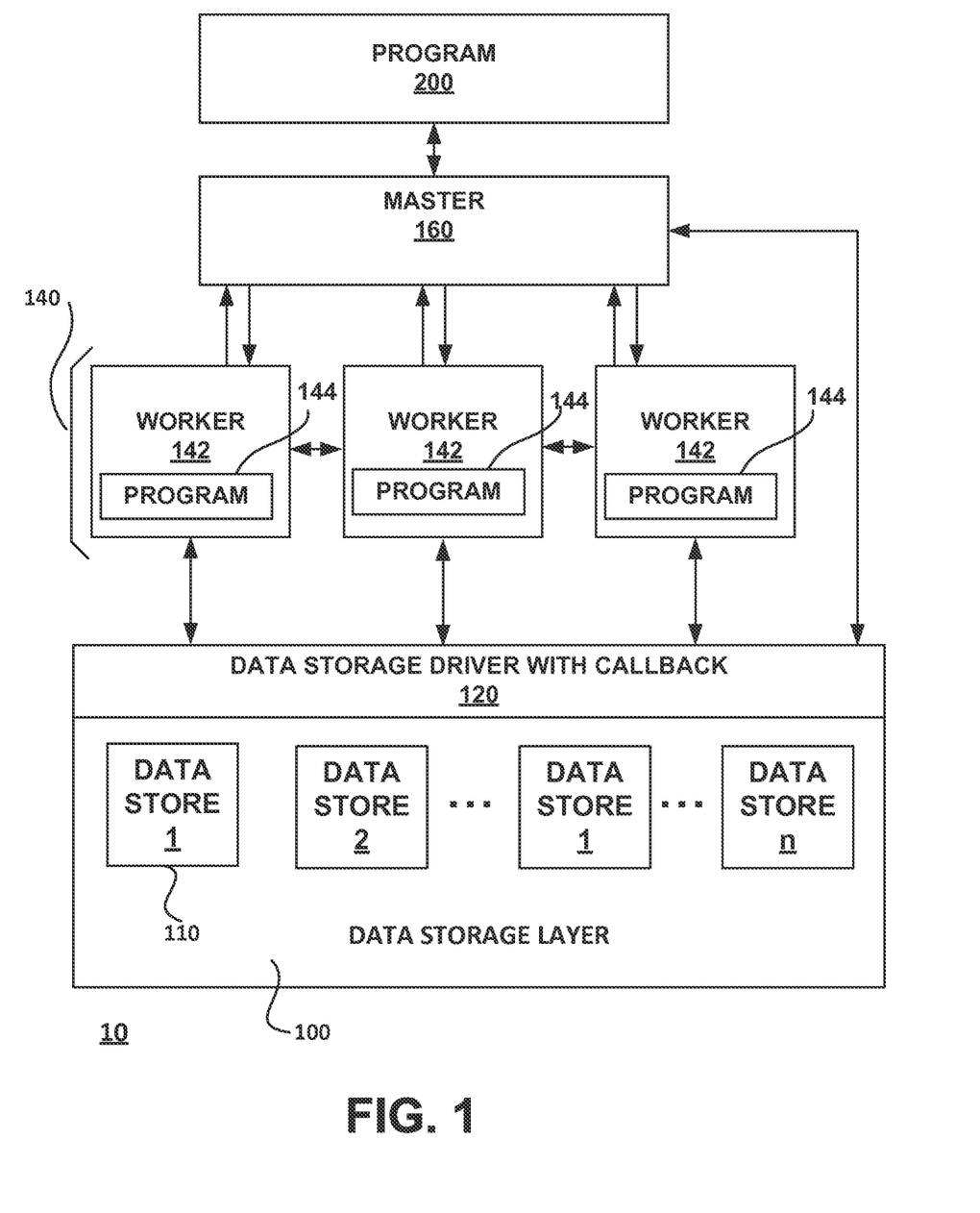
FIG. 1 is an example block diagram of a system that supports continuous analytics example.

According to one example, the method and system, which provide load balancing between workers that execute partitions of a sparse array by repartitioning the sparse array, are used as a part of a system that provides continuous analytics. FIG. 1 is a block diagram of a system that supports continuous analytics, according to one example. Moreover, the system of FIG. 1 scales to address the size of the related dataset. Finally, the system of FIG. 1 can apply to centralized or distributed data.

In FIG. 1, system 10 includes storage layer 100, storage drive 120, worker layer 140, master 160, and program layer 200. The storage layer 100 may use a distributed data store architecture. Such an architecture makes it easier to map the complete data, or data subsets, to the distributed arrays. The storage layer 100 allows multiple and different programs to execute on the data. In an example, the storage layer 100 includes distributed data stores 110($i$). In this example, a data center may be configured with twenty such data stores 110 (1)-110(20); e.g., data servers. Co-locating the data stores 110($i$) reduces bandwidth problems and provides for fast network connections, for example. However, the data stores 110 may be geographically dispensed. In another alternative, the storage layer 100 includes a single data store (i.e., a centralized data store).

The storage driver 120 communicates between the storage layer 100 and the worker layer 140, which includes workers 142, each of which in turn includes processing devices, communications interfaces, and computer readable mediums, and each of which stores and executes a continuous analytics program 144, according to various examples. The continuous analytics program 144 may include a subset of the programming of a larger continuous analytics program that is maintained in the program layer 200. The workers 142 may be distributed or centralized.

The storage driver 120 reads input data, handles incremental updates, and saves output data. The storage driver 120 may export an interface that allows programs and distributed arrays in the program layer 200, and hence the workers 142 and master 160, to register callbacks on data. Such callbacks notify the different components of the program when new data enters a data store 110 or existing data is modified during processing.

The storage driver 120 also provides for transactional-based changes to data stored in the data stores 110. For example, if a user recommendation file for a hotel chain is to be changed based on a new recommendation from a specific hotel customer, all of the data related to that customer's new recommendation is entered into the appropriate table in the appropriate data store 110. More specifically, if the new recommendation includes three distinct pieces of data, all three pieces of data are entered, or none of the three pieces of data is entered; i.e., the data changes occur atomically, according to one example. The transactional basis for changing data is required due to the possibility that multiple sources may be writing to and modifying the same data file.

The storage driver 120, as explained below, is notified when data in the storage layer 100 changes, through modification, addition, or subtraction, for example, and in turn notifies the master 160 or workers 142 of the changes.

The master 160 acts as the control thread for execution of program layer 200 programs, according to one example. The master 160 distributes tasks to workers 142 and receives the results of the task execution from the workers 142. The master 160 and workers 142 form a logical unit. However, in an example, the master 160 and the workers 142 may execute on different physical machines or servers. Thus, the master 160 executes a control and distribution program that distributes tasks associated with a continuous analytics program. The master 160 further receives inputs from the workers 142 when tasks are completed. Finally, the master 160 may re-distribute tasks among the workers 142.

The program layer 200 includes a basic analytics program 210 (see FIG. 2) that is enhanced in certain respects to provide a scalable, continuous, analytics program. The program layer 200, in conjunction with the storage driver 120 and storage layer 100, solves the problem of structure and scalability by introducing distributed arrays (through program construct darray 222) to program 210. Distributed arrays provide a shared, in-memory view of multidimensional data stored across multiple data stores 110. That is, the distributed arrays reflect data as stored in the data stores 110. The distributed arrays are data constructs held in the program layer 200. The distributed arrays may include one or more of the following characteristics:

1) Partitioned. Distributed arrays may be partitioned into rows, columns, or blocks. Human users can either specify the size of the partitions or let the continuous analytics runtime environment determine the partitioning.

2) Shared. Distributed arrays may be read-shared by multiple concurrent tasks, as those tasks are distributed among the workers 142. In an alternative, the human user may specify that the array should be made available to all tasks. Such hints reduce the overhead of remote copying during computation. In an example, concurrent writes to array partitions are not allowed. In another example, concurrent writes are allowed when a human user defines a commutative merge function for the array to correctly merge concurrent modifications. For example, the user may specify the merge function as summation or logical disjunction.

3) Dynamic. Distributed arrays may be directly constructed from the structure of data in the storage layer 100. The storage driver 120 supports parallel loading of array partitions. If an array registered a callback on the data store, then whenever the data is changed, the array will be notified and updated by the storage driver 120. Thus, distributed arrays are dynamic: Both the contents and the size of the distributed arrays may change as data is incrementally updated.

4) Versioned. In the continuous analytics program, conflicts may arise because of incremental processing—tasks processing old and new data may attempt to update the same data. To avoid conflicts, each partition of a distributed array may be assigned a version. The version of a distributed array may be a concatenation of the versions of its partitions. Writes (using, for example the update construct) to array partitions occur on a new version of the partition. That is, calling update can cause the version number of a partition to increment. This version update can be used to ensure that concurrent readers of previous versions still have access to data. By versioning arrays, the continuous analytics program can execute multiple concurrent onchange tasks or reuse arrays across different iterations of the program.

Figure 2:
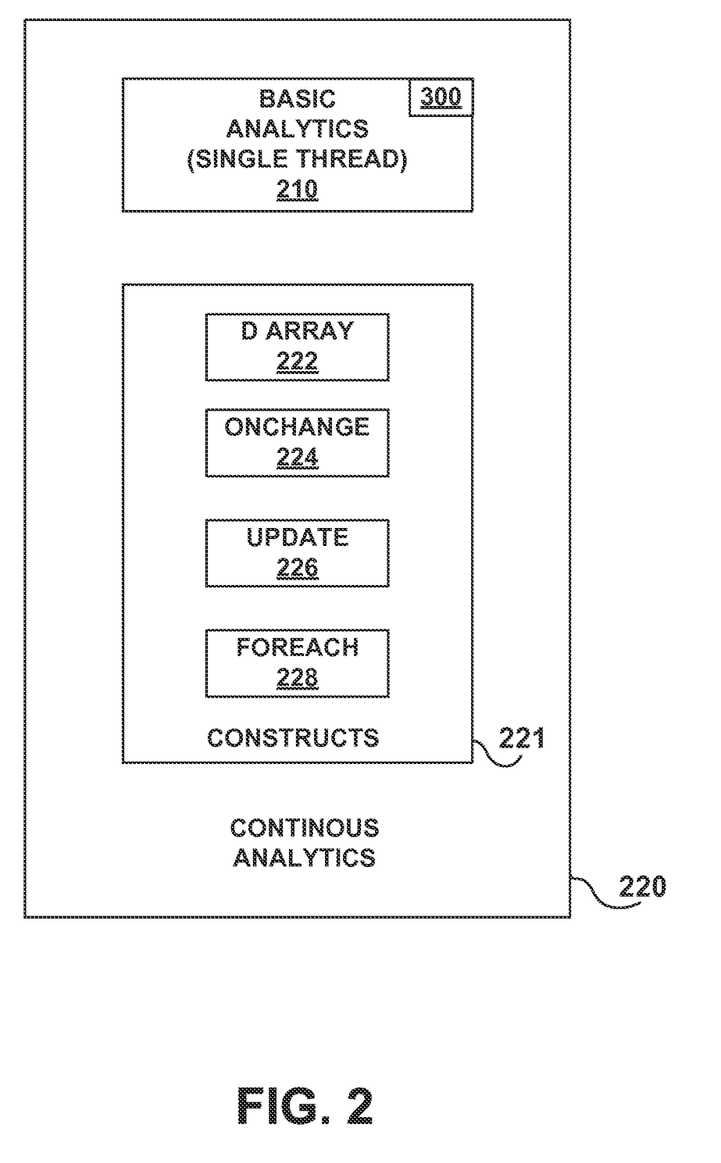
FIG. 2 is an example block diagram of a continuous analytics program that may be executed by the system of FIG. 1 example.

FIG. 2 depicts a block diagram of a continuous analytics program that may be executed on the system 10 of FIG. 1, according to one example. In FIG. 2, continuous analytics program 220 includes basic analytics program 210 with all or some of the following constructs 221: darray 222, onchange 224, update 226, and for each 228. In essence, these constructs provide for the execution of continuous processes on a consistent view of data in the storage layer 100. According to one example, the constructs 221 are extensions of an open source array based model known as R. However, various examples are well suited for extending other types of array based models. The purpose and operation of these constructs is further explained below. The distributed arrays described above define dependencies by waiting on updates to distributed arrays. For example, onchange(A){ . . . } implies that the statements embedded in the brackets { } is executed or re-executed on data referenced by array A. Array A also may be a list of distributed arrays or an array partition. The update construct 226 propagates changes to data down to the storage layer 100.

Using update 226 not only triggers the corresponding onchange tasks but also binds the tasks to the data that the tasks should process. That is, the update construct 226 creates a version vector that succinctly describes the state of the array, including the versions of partitions that may be distributed across machines. This version vector is sent to all waiting tasks. Each task fetches the data corresponding to the version vector and, thus, executes on a programmer-defined, consistent view of the data.

The runtime of the continuous analytics program 220 may create tasks on workers 142 for parallel execution. That is, multiple workers execute the same or different tasks on multiple array partitions. The continuous analytics program 220 includes for each construct 228 to execute such tasks in parallel. The for each construct 228 may invoke a barrier at the end of each task execution to ensure all other parallel tasks finish before additional or follow-on tasks are started. Thus, for each construct 228 brings each of the parallel workers 142 to the same ending point with respect to the parallel tasks before any of the parallel workers 142 being another task. Human users can remove the barrier by setting an argument in the for each construct to false.

According to various examples, incremental processing of data is provided such that when new data arrives, new results can generally be obtained without restarting the computation from scratch. More specifically, various examples provide efficient and fast access to large data sets, acquire data from these data sets, divide the data into abstractions referred to herein as distributed arrays, distribute the arrays and the processing tasks among a number of processing platforms, and update the data processing as new data arrives at the large data sets. In various examples, currently available systems are extended by using language primitives, as add-ons, for scalability, distributed parallelism and continuous analytics. In particular, various examples provide the constructs darray and onchange to express those parts of data analysis that may be executed, or re-executed, when data changes. In an aspect, various examples can be used to ensure, even though the data is dynamic, that the processes "see" a consistent view of the data. For example, if a data analysis process states y=f(x), then y is recomputed automatically whenever x changes. Such continuous analytics allow data updates to trigger automatic recalculation of only those parts of the process that transitively depend on the updated data.

As noted above, continuous analytics may be important to businesses and agencies, and many complex analytics are transformations on multidimensional arrays. For example, in an Internet product or serviced delivery system, user recommendations or ratings may play a vital marketing role, and product and service offers may be updated as new customer ratings are added to a ratings dataset. Many examples of such Internet-based systems exist, including Internet-based book stores, online movie delivery systems, hotel reservation services, and similar product service systems. Other examples include online advertisers, who may sell advertisement opportunities through an auction system, and social network sites. All of these businesses or applications may have three characteristics. First, they analyze large amounts of data—from ratings of millions of users to processing links for billions of Web pages. Second, they continuously refine their results by analyzing newly arrived data. Third, they implement complex processes—matrix decomposition, eigenvalue calculation, for example—on data that is incrementally appended or updated. For example, Web page ranging applications and anomaly detection applications calculate eigenvectors of large matrices, recommendation systems implement matrix decomposition, and genome sequencing and financial applications primarily involve array manipulation. Thus, the expression of large sets of data elements in arrays, makes the complex analysis mentioned above not only feasible, but also efficient.

Figure 3:
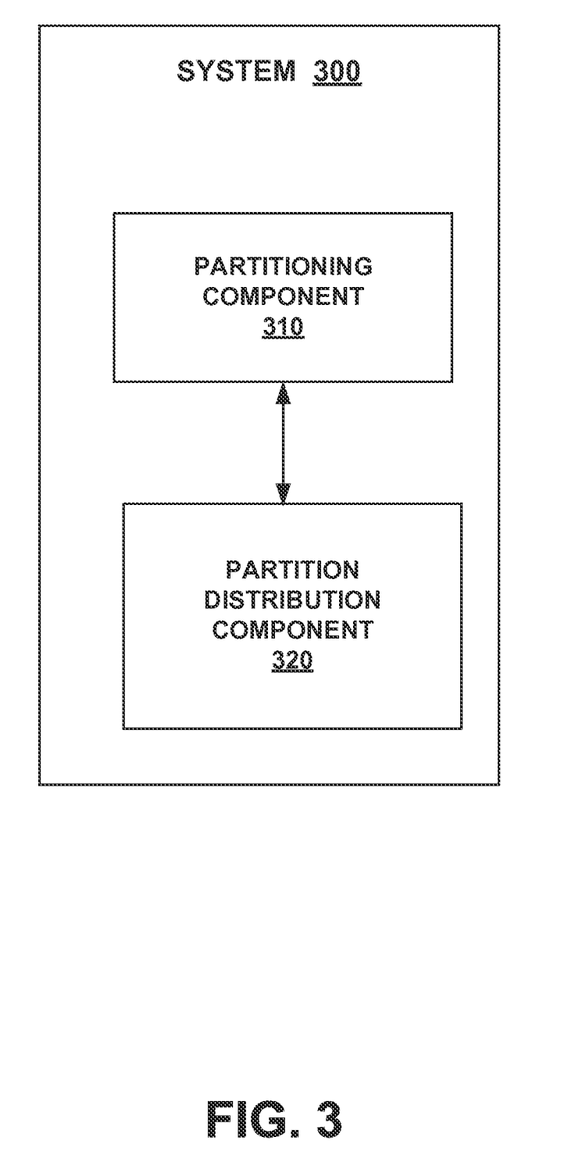
FIG. 3 depicts a system for load-balanced sparse array processing, according to one example.

FIG. 3 depicts a system 300 for load balancing the processing of sparse arrays, according to one example. The system 300 can be implemented using hardware, hardware and software, hardware and firmware, or a combination thereof.

The continuous analytics component 220, according to one example, includes the system 300. The system 300 includes a partitioning component 310 and a partition distribution component 320 that are coupled with each other.

The partitioning component 310 is for partitioning a sparse array into first partitions and partitioning a second array into second partitions based on an invariant relationship between the sparse array and the second array, where the sparse array and the second array are associated with a computation involving the sparse array and the second array. The second array can be a sparse or dense array.

The partitioning component 310 is also for determining third partitions of the sparse array and corresponding fourth partitions of the second array based on the invariant relationship and measurements of load received from each of the workers, where at least one of the first partitions and the corresponding second partition is different from one of the third partitions and the corresponding fourth partition.

The partition distributing component 320 is for distributing the first partitions and the corresponding second partitions to workers, where a different first partition and corresponding second partition is distributed to each of the worker.

The partition distributing component 320 is also for redistributing the at least one of the first partitions and the corresponding second partition that is different among the workers, wherein a different third partition and corresponding fourth partition is executed by each of the workers.

According to one example, the system 300 is located at a master that controls the workers. For example, the master can monitor the workers by receiving measurements of load from each of the workers, sort the measurements of load, for example, in descending order, determine the median value of the measurements of load, calculate normalized values based on the measurements of load and the median value, compare the normalized values as a part of determining if there is a load imbalance between the workers and determine how to repartition the sparse array and the second array. The system 300 can determine whether it is worth while to repartition in the event of a load imbalance, for example, by comparing the normalized values to a threshold. The system 300 can repartition, for example, by sending a message to workers to split partitions or merge partitions. The system 300 can cause portions of partitions to be moved between the workers in order to repartition.

According to one example, the system 300 further comprises a worker monitoring component for receiving measurements of load from each of the workers. According to one example, the system 300 further comprises a load imbalance determining component for determining if there is a load imbalance between the workers by sorting the measurements of load, determining a median value of the measurements of load, calculating normalized values for each of the measurements of load, comparing the normalized values with each other. According to one example, the partitioning component is further configured for determining whether to repartition by comparing normalized values obtained from measurements of load for each worker and comparing the normalized values with a threshold. According to one example, the partitioning component is further configured for determining to split a partition if a corresponding normalized value is above the threshold and the measurement of load is above a median measurement of load and determining to merge a partition with another partition if a corresponding normalized value is above the threshold and the measurement of load is below the median measurement of load.

According to one example, the programmer designates the programs associated with the system 300 that are safe under dynamic partitioning. For example, if a program, such as a subroutine or function, does not have information pertaining to the number of partitions and treats all partitions the same, then that program would not be safe under dynamic partitioning. In a more specific example, if the program assumes there are three partitions and has an instruction such as A[x,y]=1 that sets an element of all of the partitions to 1 when in fact there are fewer or more partitions than three, then the program is not safe under dynamic partitioning because it will result in an incorrect result. This is just one example of why a programmer would know to designate a program as unsafe under dynamic partitioning.

Figure 4:
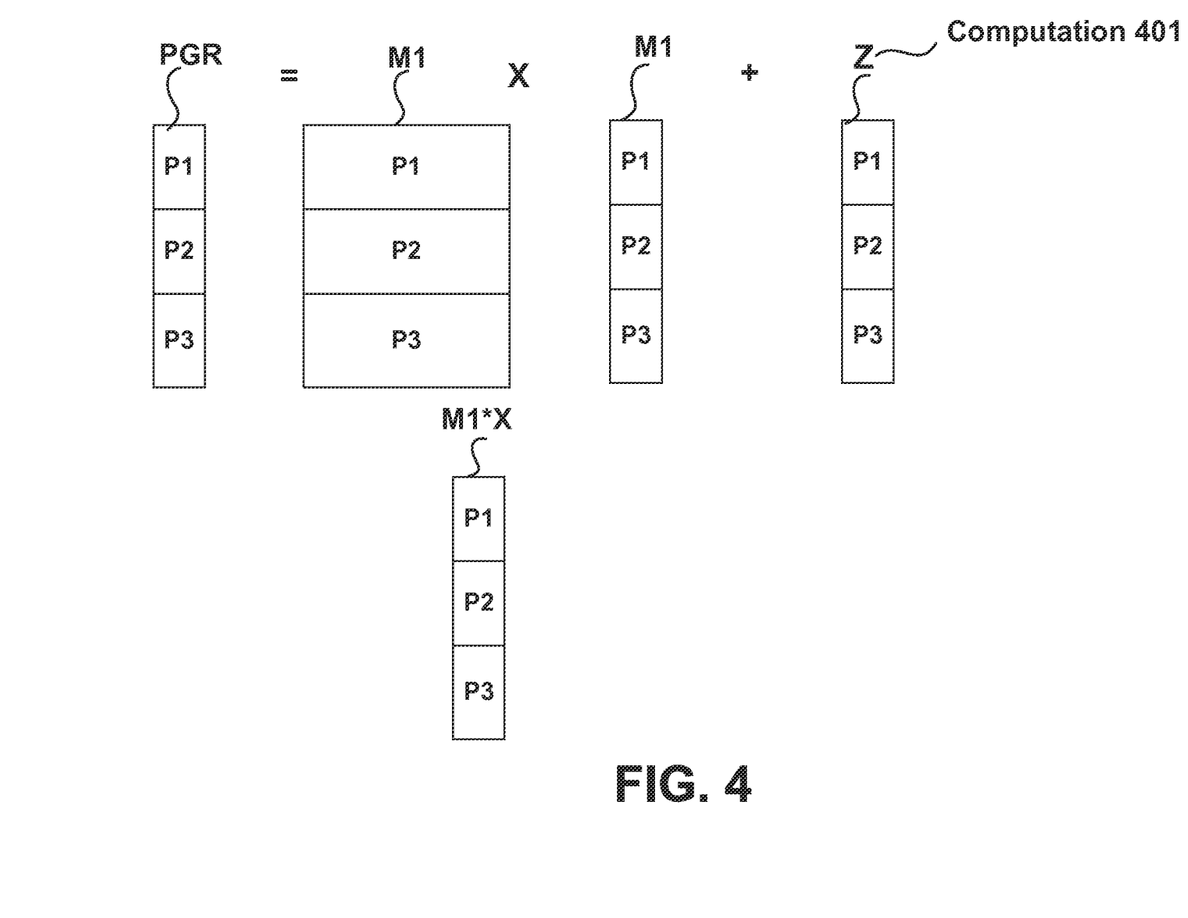
FIGS. 4 and 5 depict block diagrams of arrays, which represent matrixes, and computations that can be performed on those arrays, according to various examples.
Figure 5:
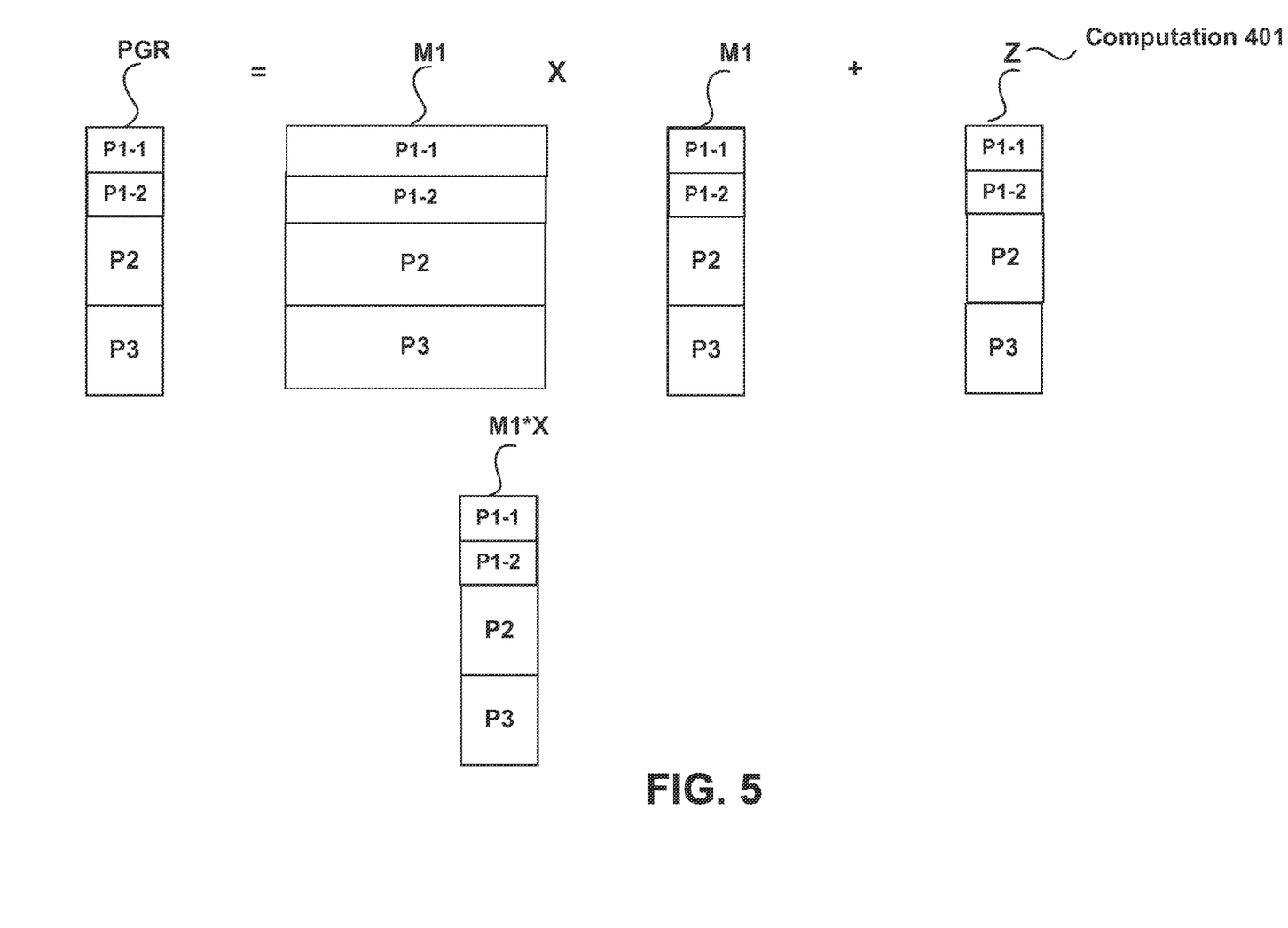

FIGS. 4 and 5 depict block diagrams of arrays, which represent matrixes, and a computation 401 that can be performed on those arrays, according to various examples. According to one example, each of the arrays has the same number of rows but can have a different number of columns. For example, as depicted, arrays pgr, M1, X, M1*X, and Z have K rows and arrays pgr, X, M1*X and Z have one column and the array M1 has N columns.

The respective arrays can be divided into partitions. For example, in FIG. 4 arrays pgr, M1, X, M1*X and Z are divided into respective partitions P1, P2, P3 where corresponding partitions each have the same number of rows. For example, the partitions P1 of each array pgr, M1, X, M1*X and Z have the same number of rows, the partitions P2 of each array pgr, M1, X, M1*X and Z have the same number of rows, the partitions P3 of each array pgr, M1, X, M1*X and Z have the same number of rows. Similarly, referring to FIG. 5, partitions P1-1 of pgr, M1, X, M1*X and Z have the same number of rows, partitions P1-2 of pgr, M1, X, M1*X and Z have the same number of rows and so on with partitions P2 and P3 of pgr, M1, X, M1*X and Z.

Two partitions that have the same number of rows shall be referred to as having the same height. The phrase "corresponding rows" is used to refer to rows with the same ordinal number in two different partitions. For example, the first rows in pgr, M1, X, M1*X and Z correspond with each other. Similarly, the second rows in pgr, M1, X, M1*X and Z correspond with each other and so on through to the Kth row of pgr, M1, X, M1*X and Z.

One or ore of arrays pgr, M1, X, M1*X and Z may also be sparse arrays.

Referring to FIG. 4, one rule of linear algebra is that when two matrixes, as represented by a sparse array M1 and second array X, are multiplied together each partition of the first matrix M1 should be multiplied by the entire second array X. For example, each of sparse array M1's partitions P1, P2, P3 are multiplied by the entire array X. More specifically, M1's partition P1 is multiplied by the entire array X, M1's partition P2 is multiplied by the entire array X, and M1's partition P3 is multiplied by the entire array X. M1*X is the result of multiplying M1 with X, according to one example.

Still referring to FIG. 4, another rule of linear algebra is that when two matrixes, as represented by array M1*X and second array Z, are added together, corresponding partitions of the two matrixes can be added together. For example, M1*X's partition P1 and Z's partition P1 can be added together, X's partition P2 and Z's partition P2 can be added together, M1*X's partition P3 and Z's partition P3 can be added together. However, partitions of two matrixes that do not correspond with each other are not added together. For example, M1*X's partition P1 would not be added with Z's partition P2 or P3, M1*X's partition P2 would not be added with Z's partitions P1 or P3, and X's partition P3 would not be added with Z's partitions P1 or P2.

The invariant relationships, for example, in the form of rules of linear algebra apply to the arrays depicted in FIG. 5 in a similar manner, according to various examples.

The blocks that represent features in FIGS. 1-5 can be arranged differently than as illustrated, and can implement additional or fewer features than what are described herein. Further, the features represented by the blocks in FIGS. 1-5 can be combined in various ways.

Figure 6:
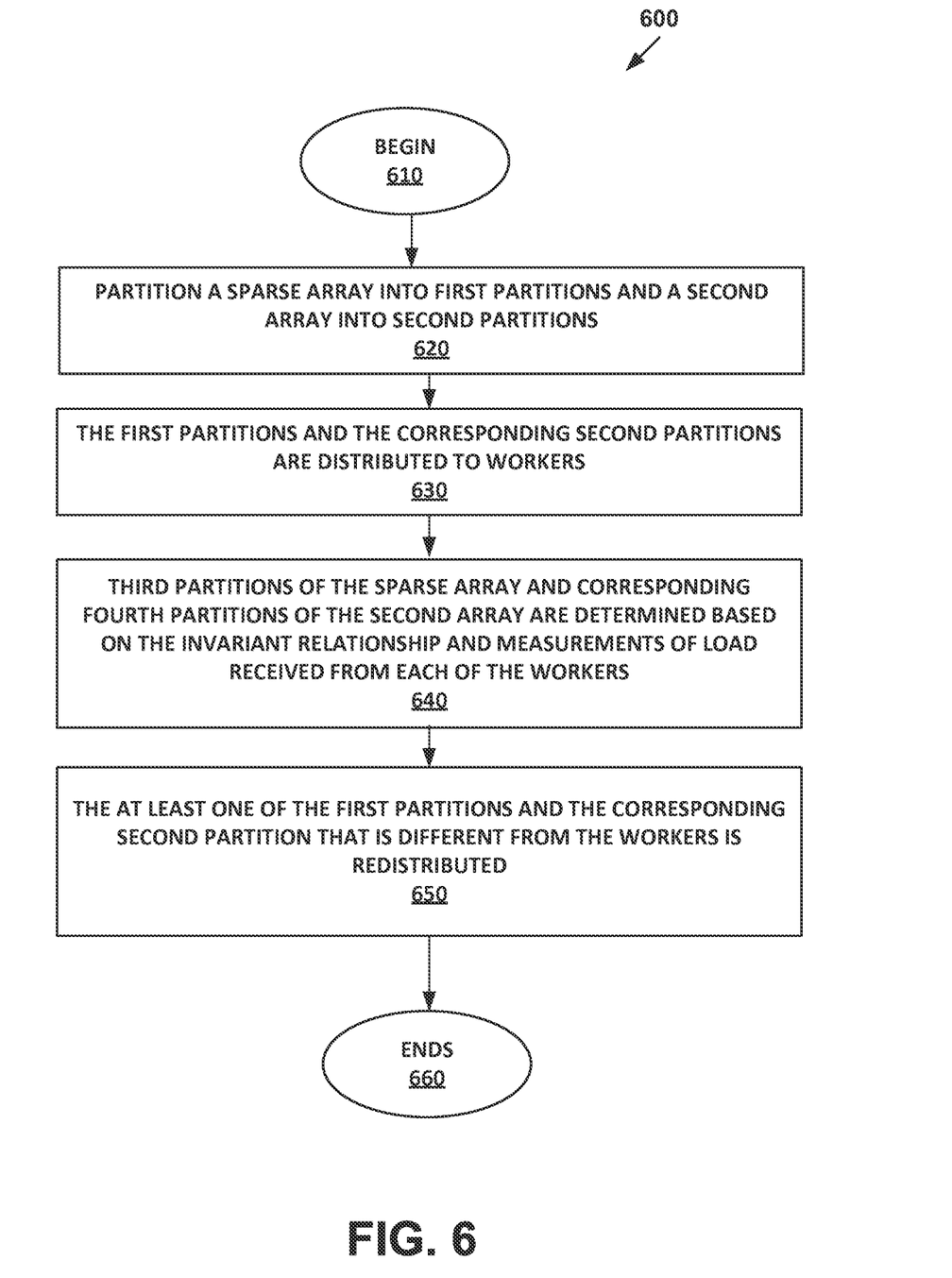
FIG. 6 depicts a block diagram of an example method for load-balanced sparse array processing example.

FIG. 6 depicts a block diagram of a method for load-balanced sparse array processing of a sparse array, according to one example.

Although specific operations are disclosed in flowchart 600, such operations are exemplary. That is, examples of the present invention are well suited to performing various other operations or variations of the operations recited in flowchart 600. It is appreciated that the operations in flowchart 600 may be performed in an order different than presented, and that not all of the operations in flowchart 600 may be performed.

The discussion of the flow chart 600 shall refer to FIGS. 4 and 5. Although FIGS. 4 and 5 depict a computation 401, the computation 401 is just an example of a computation. The computation 401 depicts M1 times X added to Z which equals pgr. Various examples are well suited to computations that include fewer arrays, more arrays, fewer operators, or additional operators. Examples of operators are equal, plus, minus, and multiplication. A computation may also include brackets to designate prioritization of processing sub-computations.

At 610, the method begins.

At 620, a sparse array is partitioned into first partitions and a second array is partitioned into second partitions. As depicted in FIG. 4, M1 is an example of a sparse array and X and Z are examples of a second array.

The sparse array M1 and the second arrays X and Z are associated with a computation involving the sparse array M1 and the second arrays X and Z. More specifically, as depicted, the computation involves M1 being multiplied by array X and then added with array Z resulting in array pgr.

The sparse array M1 is partitioned into first partitions P1, P2, P3 and the second arrays X and Zane partitioned into the partitions P1, P2, P3. According to one example, initially the partitions of the respective arrays have the same number of rows. For example, P1, P2, P3 of pgr, M1, X, and Z all have the same number of rows. For example, if there are three workers and there are 90 rows in the arrays pgr, M1, x and Z, then each of the partitions P1, P2, P3 of pgr, M1, and z respectively have 30 rows because 90 rows divided by 3 workers equals 30 rows for each of the 3 workers.

Other partitioning schemes may be used. For example, instead of the partitions including the same number of rows, the performance criteria, such as the processing power, associated with a worker may be used as a weighting factor in determining the number of rows that will be included in the partition processed by that worker.

The sparse array M1 and the second arrays X and Z are partitioned based on an invariant relationship between the sparse array M1 and the second arrays X and Z. An example of an invariant relationship includes rules of linear algebra.

One rule of linear algebra is that when two matrixes, as represented by array M1*X and second array Z, are added together, corresponding partitions of the two matrixes can be added together. For example, M1*X's partition P1 and Z's partition P1 can be added together, M1*X's partition P2 and Z's partition P2 can be added together, M1*X's partition P3 and Z's partition P3 can be added together.

The partitions P1, P2, P3 of M1*X are examples of first partitions and the partitions P1, P2, P3 of Z are each an example of a corresponding second partition. More specifically, P1 of second array Z corresponds with P1 of sparse array M1*X, P2 of second Z corresponds with P2 of sparse array M1*X, and P3 of second array Z corresponds with P3 of sparse array M1*X.

According to one example, when the operation between the sparse array and the second array involves addition, as is the case with M1*X and Z, different second partition corresponds with each of the first partitions. For example, P1, P2 and P3 of array Z each correspond with a different partition P1, P2, and P3 of sparse array M1*X. More specifically, M1*X's P1 corresponds with Z's P1 but does not correspond with any of Z's other partitions. M1*X's P2 corresponds with Z's P2 but does not correspond with any of Z's other partitions and so on.

Referring to FIG. 4, another rule of linear algebra is that when two matrixes, as represented by array M1*X and second array Z, are added together, corresponding partitions of the two matrixes can be added together. For example, M1*X's partition P1 and Z's partition P1 can be added together, X's partition P2 and Z's partition P2 can be added together, M1*X's partition P3 and Z's partition P3 can be added together. However, partitions of two matrixes that do not correspond with each other are Pot added together. For example, M1*X's partition P1 would not be added with Z's partition P2 or P3, M1*X's partition P2 would not be added with Z's partitions P1 or P3, and X's partition P3 would not be added with Z's partitions P1 or P2.

At 630, the first partitions and the corresponding second partitions are distributed to workers. A different first partition and corresponding second partition is distributed to each of the workers. For example, partitions P1, P2, P3 of sparse array M1 are examples of first partitions. The entire array X and the partitions P1, P2, P3 of array Z are examples of corresponding second partitions. In this example, the sparse array M1's partitions P1, the entire array X and the array Z's partition P1 could be distributed to a first worker. The sparse array M1's partition P2, the entire array X and the array Z's partition P2 could be distributed to a second worker. The sparse array M1's partition P3, the entire array X and the array Z's partition P3 could be distributed to a third worker.

Each of the workers can process the respective partitions that they received in a loop to converge on a solution for pgr. A measurement of load can be obtained for each of the iterations of the loop. An example of a measurement of load is the execution time of a worker processing their respective partitions for an iteration of the loop associated with that worker. For example, assume that the first worker took 100 seconds, the second worker took 50 seconds, and the third worker took 35 seconds in the first iteration of processing their respective received partitions. The workers can return their respective measurements of load to a master.

At 640, third partitions of the sparse array M1 and corresponding fourth partitions of the second array Z are determined based on the invariant relationship and measurements of load received from each of the workers.

Continuing the example, the master can sort the received measurements of load in descending order and determine the median of the received measurements. In this example, the measurements could be sorted in the order of 100, 50, and 35.

The master can compute a normalized value for each of the measurements where there is one normalized value for each of the measurements of load, for example, by dividing each of the measurements that is greater than the median by the median and dividing the median by each of the measurements that is less than the median. Continuing the example, 50 seconds would be the median, then 100 seconds could be divided by 50 seconds resulting in the normalized value 2, 50 seconds could be divided by 50 seconds resulting in the normalized value 1, and 50 seconds could be divided by 35 seconds resulting in the normalized value 1.4.

A determination can be made as to whether there is a load imbalance between the workers based on the received measurements of load from each of the workers. For example, the normalized values of 2 and 1.4 can be compared to the normalized value 1 associated with the median of 50 seconds to determine that there is a load imbalance.

Each of the normalized values can be compared to a threshold. For example, assume that the threshold is 1.5. In this case, the normalized values 2, 1 and 1.4 could be compared to the threshold 1.5. Comparing the normalized values to the threshold, according to one example, enables determination of whether it would be beneficial to repartition in order to address the load imbalance. For example, there is a certain amount of overhead associated with repartitioning, such as the processing power used for the computations and network bandwidth in the event that one or more of the workers and the master reside on separate computer systems. Various examples are well suited for other thresholds.

According to one example, the partitions associated with high load imbalance are repartitioned. For example, if the normalized value is above the threshold and if the measurement of load is above the median, then the partition can be split into two or more partitions. More specifically in this illustration, partitions P1 of sparse array M1 and second array Z are associated with high load imbalance because the normalized value 2 is higher than the threshold 1.5. Partitions P1 of sparse array M1 and second array Z can be split and redistributed. For example, partitions P1 of sparse array M1 and second array Z can be split into partitions P1-1 and P1-2 of sparse array M1 and second Z, as depicted in FIG. 5. Further, referring to FIGS. 4 and 5, partitions P2 and P3 of sparse array M1 and second array Z have not been changed.

Various schemes for splitting a partition can be used. For example, corresponding partitions may be split into equal halves. More specifically, partitions P1-1 and P1-2 of pgr, M1 and Z (FIG. 5) may be respective halves of partitions P1 of pgr, M1 and Z (FIG. 4). In another example, corresponding partitions may be split unequally. More specifically, partitions P1-1 of pgr, M1 and Z (FIG. 5) may be 25 percent of partitions P1 of pgr, M1 and Z (FIG. 4) and then partitions P1-2 of pgr, M1 and Z may be the remaining 75 percent of partitions P1 of pgr, M1 and Z (FIG. 4). Various examples are well suited for other distributions besides 25/75 split. According to one example, performance criteria, such as the processing power, associated with a worker may be used as a weighting factor in determining the number of rows that will be included in the partition processed by that worker. For example, if one part of partitions P1 of pgr, M and Z (FIG. 4) is to be executed by worker n and another part of the partitions P1 of pgr, M and Z (FIG. 4) are to be executed by worker n+1, then performance criteria worker n and worker n+1 may be used to determine the number of rows that will be included in partitions P1-1 and P1-2 of pgr, M and Z (FIG. 5). Further, various examples are well suited for splitting a partition into more than two new partitions.

Therefore, in this example, P1-1, P1-2, P2 and P3 are examples of third partitions of the sparse array M1, P1-1, P1-2, P2 and P3 of array M1*X and partitions P1-1, P1-2, P2 and P3 of second array Z are examples of corresponding fourth partitions of second arrays M1*X and Z that have been determined based on invariant relationships, such as linear algebra and the measurements of load received from each of the workers.

At least one of the first partitions and the corresponding second partition is different than one of the third partitions and the corresponding fourth partition. For example, partition P1-1 of sparse array M1 and partition P1-2 of second array Z depicted in FIG. 5 is different than P1 of sparse array M1 and partition P1 of second array Z depicted in FIG. 4.

In this example, the partitions P1 of sparse array M and second array Z as depicted in FIG. 4 have been split. According to another example, a partition is merged with another partition if their respective normalized values are above the threshold and if their measurements of load are below the median. For example, assume that there are four partitions P1, P2, P3, P4 and both of the partitions P3 and P4 qualify for being merged. Then the partitions P3 and P4 can be merged based on their invariant relationship. More specifically, partition P4 could be merged into P3, then the new partition P3 for the sparse array M, the new partition P3 for the second array Z, and the entirety of array X can be processed by the same worker. Various examples are well suited for other merging schemes. For example, more than two partitions may be merged. In another example, the performance criteria associated with the one or more workers that will execute new partitions that result from merging may be used as a part of determining which partitions to merge.

According to one example, consecutive partitions are merged. For example, if an array included consecutive partitions P1, P2, P3 and P4, P3 and P4 may be candidates for a merge, but P2 and P4 would not be candidates for a merge.

At 650, the at least one of the first partitions and the corresponding second partition that is different among the workers is redistributed. A different third partition and corresponding fourth partition is executed by each of the workers. For example, referring to FIG. 5, assuming that there are four workers, partition P1-1 of sparse array M1, the entirety of X and partition P1-1 of second array Z can be executed on one worker, partition P1-2 of sparse array M1, the entirety of second array X and partition P1-2 of second array Z can be executed on a second worker, partition P2 of sparse array M1, the entirety of second array X and partition P2 of second array Z can be executed on a third worker, and partition P3 of sparse array M1, the entirety of second array X and partition P2 of second array Z can be executed on a fourth worker. In this example, partition P1-2 of sparse array M1, the entirety of second array X and partition P1-2 of second array Z and the partition P2 of sparse array M1, the entirety of second array X and partition P2 of second array Z can continue to be executed on the same workers while, for example, either partition P1-1 of sparse array M1, the entirety of second array X and partition P1-1 of Z or the partition P1-2 of sparse array M1, the entirety of second array X and partition P1-2 of second array Z could be moved to a new worker.

As can be seen, various examples provide for adding workers or removing workers from processing of the computation 401. For example, in the case of splitting a partition, a new worker may be added. In the case of merging partitions, a worker may be removed. However, the number of workers may remain the same in the event of a split or a merge. For example, if one partition is split into two and two other partitions are merged, the number of workers after the repartitioning could remain the same as the number of works before the repartitioning. This is just one example of why the number of workers may remain the same.

A different third partition and corresponding fourth partition is executed by each of the workers. Examples of third partitions in this illustration as depicted in FIG. 5 are P1-1, P1-2, P2, P3 of the sparse array M1. Examples of corresponding fourth partitions in this illustration as depicted in FIG. 5 are the entire array X and P1-1 of second array Z, the entire array X and P1-2 of second array Z, the entire array X and P3 of second Z, the entire array X and P4 of second array Z.

According to one example, partial results of pgr are distributed among the workers according to the invariant relationships. For example, referring to FIG. 4, partition P1 of pgr would be processed by the same worker that processes partitions P1 of the sparse array M1 and second array Z. Referring to FIG. 5, partition P1-1 of pgr would be processed by the same worker that processes partitions P1-1 of sparse array M1 and second array Z and partition P1-2 of pgr would be processed by the same worker that processes partitions P1-2 of sparse array m1 and second array Z. According to one example, if a partition or part of a partition of a sparse array and a corresponding partition of a second array is moved from one worker to another, then the corresponding partition of the result pgr would also be moved with them to the same worker.

According to one example, the sparse array M1 and the one or more second arrays X and Z associated with a computation 401 can be dynamically repartitioned while the computation 401 is being processed.

According to various examples, partitioning and repartitioning based on the invariant relationship provides partitions that are compatible with each other because they can be properly executed using rules of linear algebra.

At 660, the method ends.

According to various examples, the master may receive measurements of load for each of the iterations of loops that process the arrays pgr, M1, X and Z in the respective workers. Operations 640 and 650 may be repeated in response to the master repeatedly receiving the measurements of load from the workers.

According to various examples discussed herein, the values associated with the arrays M1, X and Z can change dynamically while the computation 401 is being processed to determine pgr. Various examples as discussed herein can provide continuous analytics with a consistent view of the data without restarting the computation 401 for pgr from scratch.

When processing has completed, the final result in pgr can be outputted, for example, by storing, displaying, or printing the one or more values of pgr.

Various examples provide for modifying data to transform the state of a computer system. For example, the computation 401 modifies the data of the pgr which transforms the state of one or more computer systems. In another example, partitioning and repartitioning arrays pgr, M1, X and Z modifies the data which transforms the state of one or more computer systems. In a third example, redistributing partitions to fewer or additional workers modifies data to transform the state of one or more computer systems. These are just a few examples of how various examples transform the state of one or more computer systems.

Any one or more of the examples described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various examples of the present invention are realized, in one example, as a series of instructions (e.g., software program) that reside within non-transitory computer readable storage memory of a computer system and are executed by the computer processor of the computer system. When executed, the instructions cause the computer system to implement the functionality of various examples of the present invention. According to one example, the non-transitory computer readable storage medium is tangible.

Various examples of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various examples have been described in various combinations and illustrations. However, any two or more examples or features may be combined. Further, any example or feature may be used separately from any other example or feature. Phrases, such as "an example," "one example," among others, used herein, are not necessarily referring to the same example. Features, structures, or characteristics of any example may be combined in any suitable manner with one or more other features, structures, or characteristics.

What is claimed is:

1. A method, comprising
partitioning a first array into first partitions and partitioning a second array into second partitions based on an invariant relationship between the first array and the second array, wherein the first array and the second array are associated with a computation involving the first array and the second array;
distributing the first partitions and the corresponding second partitions to a set of workers, wherein a different partition of the first partitions and corresponding partition of the second partitions are distributed to each worker of the set of workers;
determining a repartitioning of the first array and the second array into third partitions of the first array and corresponding fourth partitions of the second array based on the invariant relationship and measurements of load received from each of the workers, wherein at least one partition of the first partitions and a corresponding partition of the second partitions is different from one partition of the third partitions and a corresponding partition of the fourth partitions; and
redistributing the at least one of the first partitions and the corresponding second partition that is different among the workers, wherein a different partition of the third partitions and a corresponding partition of the fourth partitions are executed by each worker of the set of workers, wherein the partitioning, distributing, determining and redistributing are performed by one or more computer systems.

2. The method as recited by claim 1, wherein the invariant relationship is based on rules of linear algebra.

3. The method as recited by claim 1, wherein the method further comprises:
determining there is a load imbalance between the workers based on received measurements of load from each of the workers.

4. The method as recited by claim 3, wherein the method further comprises:
sorting the received measurements of load from each of the workers in descending order; and
determining a median of the measurements of load by comparing the measurements of load.

5. The method as recited by claim 4, wherein the method further comprises:
computing normalized values for each of the measurements of load based on the median; and
determining whether to repartition by comparing the normalized values with a threshold.

6. The method as recited by claim 5, wherein the method further comprises:
splitting a partition if a corresponding normalized value is above the threshold and the measurement of load is above a median measurement of load; and
merging a partition with another partition if a corresponding normalized value is above the threshold and the measurement of load is below the median measurement of load, wherein corresponding partitions associated with load imbalance are repartitioned in a compatible manner based on the invariant relationship.

7. The method as recited by claim 1, wherein the method further comprises:
using a master to control the workers, wherein the master and the workers are associated with a distributed system.

8. A tangible computer readable storage medium having computer-executable instructions stored thereon for causing a computer system to perform a method, comprising:
partitioning a first array into first partitions and partitioning a second array into second partitions based on an invariant relationship between the first array and the second array, wherein the first array and the second array are associated with a computation involving the first array and the second array;
distributing the first partitions and the corresponding second partitions to a set of workers, wherein a different partition of the first partitions and corresponding partition of the second partitions are distributed to each worker of the set of workers;
determining a repartitioning of the first array and the second array into third partitions of the first array and corresponding fourth partitions of the second array based on the invariant relationship and measurements of load received from each of the workers, wherein at least one partition of the first partitions and a corresponding partition of the second partitions is different from one partition of the third partitions and a corresponding partition of the fourth partitions; and
redistributing the at least one of the first partitions and the corresponding second partition that is different among the workers, wherein a different partition of the third partitions and a corresponding partition of the fourth partitions are executed by each worker of the set of workers.

9. The tangible computer readable storage medium of claim 8, wherein the method further comprises:
monitoring the workers at a master by receiving measurements of load from each of the workers.

10. The tangible computer readable storage medium of claim 9, wherein the method further comprises:

monitoring the workers in a distributed system, wherein the master and the workers are associated with the distributed system.

11. The tangible computer readable storage medium of claim 10, wherein the method further comprises:
   determining if there is a load imbalance between the workers by sorting the measurements of load from each of the workers in descending order and comparing the measurements of load.

12. The tangible computer readable storage medium of claim 10, wherein the method further comprises:
   determining a median of the measurements of load; and
   computing normalized values for each of the measurements of load based on the median.

13. The tangible computer readable storage medium of claim 12, wherein the method further comprises:
   determining whether to repartition by comparing the normalized values with a threshold; and
   repartitioning by splitting a partition if a corresponding normalized value is above the threshold and the measurement of load is above a median measurement of load, and merging a partition with another partition if a corresponding normalized value is above the threshold and the measurement of load is below the median measurement of load, wherein corresponding partitions associated with load imbalance are repartitioned in a compatible manner based on the invariant relationship.

14. The tangible computer readable storage medium of claim 13, wherein the method further comprises:
   associating a different second partition with each of the first partitions; and
   associating a different fourth partition with each of the third partitions.

15. A method, comprising
   partitioning a first array into a first set of partitions;
   partitioning a second array into a second set of partitions, each partitions of the first set of partitions corresponding to a partition in the second set of partitions, wherein the first array and the second array are associated with a computation involving the first array and the second array;
   distributing each partition of the first set of partitions and a corresponding partition of the second set of partitions to a different worker in a set of workers;
   determining a repartitioning of the first array and the second array based on the invariant relationship and measurements of load received from the set of workers, wherein the repartitioning partitions the first array into a third set of partitions and the second array into a fourth set of partitions; and
   redistributing each of at least one partition of the third set of partitions and a corresponding partition of the fourth set of partitions to a different worker in the set of workers.

* * * * *